United States Patent
Petrik

(10) Patent No.: US 7,842,271 B2
(45) Date of Patent: Nov. 30, 2010

(54) MASS PRODUCTION OF CARBON NANOSTRUCTURES

(76) Inventor: Viktor I. Petrik, 7/3 Bolotnikovskoy Street, Moscow (RU) 113556

( * ) Notice: Subject to any disclaimer, the term of this patent is extended or adjusted under 35 U.S.C. 154(b) by 1343 days.

(21) Appl. No.: 11/007,614

(22) Filed: Dec. 7, 2004

(65) Prior Publication Data
US 2006/0121279 A1 Jun. 8, 2006

(51) Int. Cl.
*C01B 31/00* (2006.01)
*C01B 31/02* (2006.01)
*C01B 31/04* (2006.01)
*C09C 1/44* (2006.01)
*C09C 1/46* (2006.01)

(52) U.S. Cl. ............... 423/414; 423/445 R; 423/445 B; 423/448; 423/460; 423/DIG. 10; 977/734; 977/742

(58) Field of Classification Search ................ 423/414, 423/445, 460, 445 R, 445 B, 448; 977/734, 977/845, 898, 842, 742
See application file for complete search history.

(56) References Cited

U.S. PATENT DOCUMENTS

| | | |
|---|---|---|
| 7,128,881 B2 | 10/2006 | Petrik |
| 7,211,320 B1 | 5/2007 | Cooper et al. |
| 2003/0024884 A1 | 2/2003 | Petrik |
| 2006/0120944 A1 | 6/2006 | Petrik |
| 2006/0122451 A1 | 6/2006 | Petrik |
| 2006/0134096 A1 | 6/2006 | Petrik |
| 2006/0151382 A1 | 7/2006 | Petrik |
| 2006/0189475 A1 | 8/2006 | Petrik et al. |
| 2006/0191835 A1 | 8/2006 | Petrik |
| 2007/0051242 A1 | 3/2007 | Petrik |

FOREIGN PATENT DOCUMENTS

| | | |
|---|---|---|
| EP | 1247856 | 9/2009 |
| RU | 2085484 | 7/1997 |
| RU | 2086503 | 8/1997 |
| RU | 2109682 | 4/1998 |
| RU | 2123086 | 12/1998 |
| RU | 2163840 | 9/1999 |
| RU | 2128624 | * 10/1999 |
| SK | 5028-2005 | 10/2006 |
| WO | WO-9833742 | 8/1998 |
| WO | WO-0121018 | 3/2001 |
| WO | WO 2004/095494 | 11/2004 |

(Continued)

OTHER PUBLICATIONS

II Bobrinetskii, VK Nevolin, VI Petrik, AA Stroganov, and Yu. A. Chaplygin, "The Atomic Structure of Nanotubes Synthesized from a Carbon Mix of High Reaction Ability" Technical Physics Letters vol. 29 No. 4 (2003), pp. 347-349.*

(Continued)

*Primary Examiner*—Ngoc-Yen M Nguyen
*Assistant Examiner*—Diana J Liao
(74) *Attorney, Agent, or Firm*—Kilpatrick Stockton LLP

(57) ABSTRACT

Carbon nanostructures are mass produced from graphite. In particularly preferred aspects, graphene is thermo-chemically derived from graphite and used in numerous compositions. In further preferred aspects, the graphene is re-shaped to form other nanostructures, including nanofractals, optionally branched open-ended SWNT, nanoloops, and nanoonions.

8 Claims, 5 Drawing Sheets

FOREIGN PATENT DOCUMENTS

WO    WO-2005110590    11/2005

OTHER PUBLICATIONS

VV Minayev, VK Nevolin, and VI Petrik, "Nanotrubka Uglerodnoy Smesi Vysokoy Reaktsionnoy Sposobnosti" (translated as "Nanotubes of a High Reactivity Carbon Mixture"), Mikrosistemnaya teknnika, No. 1 (2002), pp. 41-42.*

Novoselov et al., Electric Field Effect In Atomically Thin Carbon Films, Science 2004 306: 666-669.

* cited by examiner

Prior Art Figure 2A
Prior Art Figure 2B

MASS PRODUCTION OF CARBON NANOSTRUCTURES

FIELD OF THE INVENTION

The field of the invention is carbon nanostructures, carbon nanostructure-containing materials, and their manufacture.

BACKGROUND OF THE INVENTION

Carbon nanostructures include single-wall carbon nanotubes (SWNT), multi-wall carbon nanotubes (MWNT), fullerenes, nanodiamonds, and nanoonions, and such nanostructures can be manufactured in various manners.

For example, in one relatively common manner, nanotubes can be produced by electric arc discharge. Nanotubes formed by such a process are typically MWNT. To produce SWNT, various catalytic metals (e.g., cobalt) can be added to the graphite electrodes. Arc discharge typically provides relatively low yield. Moreover, the so formed nanotubes will have in most cases relatively large inhomogeneity in length and chirality. Fullerenes can be obtained in similar manner from soot prepared in an arc generator using a carbonaceous electrode (typically without catalyst). When the electrodes are immersed in water, nanoonions can be formed that float to the surface of the water. So formed fullerenes and nanoonions can then be processed (typically in a shockwave compression) to form nanodiamonds.

Alternatively, especially where increased yield or localized synthesis of nanostructures is desired, chemical vapor deposition (CVD) can be employed in which a feed gas (e.g., methane or ethylene) is decomposed in the presence of a metal catalyst to grow nanotubes. For example, numerous nanotubes can be grown at the same time on a silicon dioxide template (that can be patterned) in predetermined positions. Such process may further be modified by the choice of the particular catalyst to influence the type of nanotube that is to be produced. While CVD synthesis is directional and relatively simple, industrial significant yields are typically not achieved. CVD was reported to also yield nanodiamonds under certain conditions, however, other nanostructures are rarely formed using CVD.

In yet another manner, laser ablation may be employed in which a laser pulse evaporates a solid target of graphite that contains a small amount of metal catalyst (~1 atomic % Ni and ~1% Co). The ablated material is transferred into a background gas (e.g., Ar) which is gently flowing through a quartz tube inside a high temperature (e.g., 1000° C.) oven. Laser ablation generally allows for tighter control of reaction conditions, and with that tends to provide a more defined population of nanotubes. Furthermore, nanotubes (and also fullerenes under certain conditions) can be produced in relatively good quantities. However, such a process is relatively energy consuming, requires expensive equipment, and highly trained personnel.

Other less common methods of forming nanostructures include plasma based synthesis of nanotubes. Such methods advantageously allow for mass production of nanotubes, but generally require megawatt quantities of energy. Similarly, nanostructures have been produced by impulse heating of fluorinated graphite dust in a 27.12 MHz inductively coupled plasma. Again, which such method may yield a relatively high yield of SWNT, the energy demand in most cases is cost-prohibitive. "Two-dimensional" carbon nanostructures, and particularly graphene, were until recently thought to be difficult, if not even impossible to manufacture. However, advances in plasma assisted CVD have yielded doped carbon flakes as described in WO 2004/095494, and more recently, graphene layers were reported that were extracted as an individual plane from a graphite crystal (Novoselov et al., Electric Field Effect in Atomically Thin Carbon Films, Science 2004 306: 666-669).

Therefore, while various materials and methods for manufacture of carbon nanostructures are known in the art, all or almost all of them suffer from one or more disadvantages, especially where large quantities of carbon nanostructures are desired. Thus, there is still a need to provide improved compositions and methods for manufacture of carbon nanostructures.

SUMMARY OF THE INVENTION

The present invention is directed to compositions and methods of carbon nanostructures, and especially those comprising, or formed from graphene or graphene-containing compositions. In generally contemplated aspects, graphene is thermo-chemically derived from a carbonaceous starting material, and the so obtained graphene can then be used directly or can be reformed into other carbon nanostructures.

In one aspect of the inventive subject matter, a composition is contemplated comprising at least 0.1 wt %, more preferably at least 10 wt %, and most preferably at least 50 wt % carbon fractals. The carbon fractals in such compositions may be metal coated, and particularly preferred metals include noble metals.

In another aspect of the inventive subject matter, a device is contemplated that comprises at least 0.1 wt %, more preferably at least 10 wt %, and most preferably at least 50 wt % graphene as an added component. Similar to the carbon fractals, it is contemplated that at least some of the graphene is coated with a metal, and especially a noble metal. Among other devices, suitable devices include electrical devices (e.g., electric conductors, electron emitters, electrodes, etc.) and non-electrical devices (e.g., structural elements, a heat conductors, etc.).

Therefore, in still other aspects of the inventive subject matter, a bulk composition of at least 1000 gram is contemplated that includes at least 10 gram of graphene and/or carbon fractals. Most preferably, the graphene and/or carbon bon fractals are present in an amount effective to increase (e.g., at least two fold, more typically at least five fold, most typically at least ten fold) thermal conductivity, electrical conductivity, adsorption, and/or a mechanical stability of the bulk composition.

In a further aspect of the inventive subject matter, a method of preparing a composition comprising a nanostructured carbon includes a step in which a carbonaceous starting material is contacted with an activated acid catalyst to form an activated intermediate. In yet another step, energy is provided to the activated intermediate to thereby form a carbon nanostructure (e.g., a graphene, a carbon nanotube, and/or a carbon fractal). Most preferably, the carbonaceous starting material is graphite, coal, tar, and/or coke, and the activated acid catalyst comprises plasma-activated hydrochloric acid. While numerous manners of providing energy are deemed suitable, it is typically preferred that the energy is thermal energy of a temperature between about 200° C. and 1200° C.

Additionally, the carbon nanostructure in contemplated methods may be contacted with an additional activated acid catalyst to form an activated carbon nanostructure, to which in a still further step energy is provided to thereby form a secondary carbon nanostructure (e.g., a single-wall carbon nanotube, a branched carbon nanotube, and a carbon fractal).

In yet another aspect of the inventive subject matter, method of producing an open-ended single-wall carbon nanotube includes a step of providing graphene, and another step of providing energy to the graphene to thereby form the open-ended single-wall carbon nanotube. Most preferably, the energy is thermal energy at a temperature of 200° C. and 600° C., and the heating step is performed in inert gas (e.g., nitrogen, argon, helium, etc.).

Various objects, features, aspects and advantages of the present invention will become more apparent from the figures and the following detailed description of preferred embodiments of the invention.

BRIEF DESCRIPTION OF THE DRAWING

Prior Art FIG. 2A is an exemplary electronmicrograph depicting expanded graphite in a characteristic worm-like form.

Prior Art FIG. 2B is a detail view showing honeycomb-like features in the worm-like material of FIG. 2A.

DETAILED DESCRIPTION

Figure 1A:
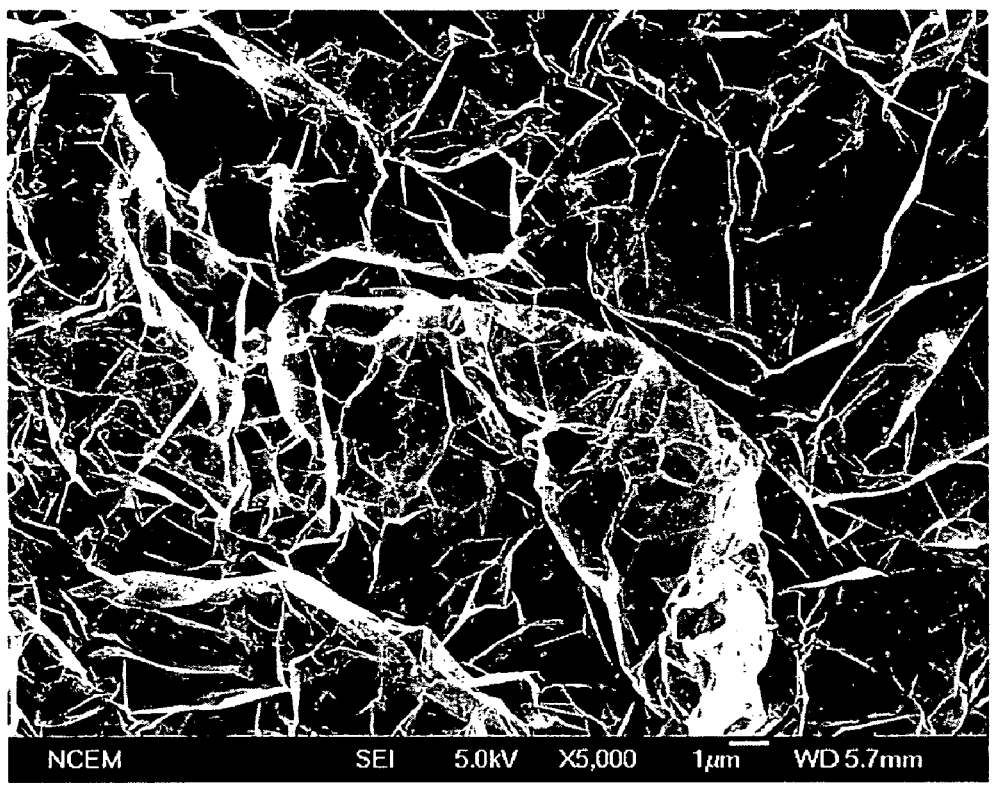
FIG. 1A is an exemplary electronmicrograph depicting graphene produced using methods according to the inventive subject matter.

The inventors have surprisingly discovered that graphene can be produced in a simple and cost-effective manner, and that the so formed graphene can be formed into other nanostructures, including open-ended single-wall carbon nanotubes, branched carbon nanotubes, and carbon fractals.

As used herein, the term "graphene" refers to a molecule in which a plurality of carbon atoms (e.g., in the form of five-membered rings, six-membered rings, and/or seven-membered rings) are covalently bound to each other to form a (typically sheet-like) polycyclic aromatic molecule. Consequently, and at least from one perspective, a graphene may be viewed as a single layer of carbon atoms that are covalently bound to each other (most typically $sp^2$ bonded). It should be noted that such sheets may have various configurations, and that the particular configuration will depend (among other things) on the amount and position of five-membered and/or seven-membered rings in the sheet. For example, an otherwise planar graphene sheet consisting of six-membered rings will warp into a cone shape if a five-membered ring is present the plane, or will warp into a saddle shape if a seven-membered ring is present in the sheet. Furthermore, and especially where the sheet-like graphene is relatively large, it should be recognized that the graphene may have the electron-microscopic appearance of a wrinkled sheet. It should be further noted that under the scope of this definition, the term "graphene" also includes molecules in which several (e.g., two, three, four, five to ten, one to twenty, one to fifty, or one to hundred) single layers of carbon atoms (supra) are stacked on top of each other to a maximum thickness of less than 100 nanometers. Consequently, the term "graphene" as used herein refers to a single layer of aromatic polycyclic carbon as well as to a plurality of such layers having a thickness of less than 100 nanometers. Typically, the dangling bonds on the edge of the graphene are saturated with a hydrogen atom. The term "about" where used in conjunction with a numeral refers to a numeric range of ±10% of the numeral, inclusive. For example, the term "about 100" refers to a numerical value of between 90 and 110, inclusive.

As further used herein, the term "carbon nanotube" refers to a cylindrical single- or multi-walled structure in which the wall(s) is (are) predominantly composed of carbon, wherein the diameter may be uniform or decreasing over the length of the nanotube. In some instances, the carbon nanotube can be curved, and is therefore also termed "carbon nanohorn".

The term "carbon fractal" as used herein refers to a macromolecule in which at least two graphene portions are coupled to each other such that the first and second portions form an angle of 90 degrees (±20 degrees). Most typically, the coupling is covalent, and the first and second portions have a length $L_{first}$, $L_{second}$, respectively, and a width $W_{first}$, $W_{second}$, respectively, wherein the ratio of $L_{first}$ to $W_{first}$, and $L_{second}$ to $W_{second}$ is at least 2:1, more typically at least 5:1, and most typically at least 10:1. Therefore, a typical carbon fractal will appear in an electron micrograph as a cross-like structure having a longitudinal portion from which at least one other longitudinal portion extends. It should be noted that the graphene in at least one of the portions may have a configuration that is other than flat, and most typically the graphene will have a curved (and sometimes even cylindrical) configuration. The term "isolated" as used in conjunction with the term "carbon fractal" herein means that the presence of the carbon fractal in a composition is ascertained (e.g., by electron microscopy, or by following a synthetic protocol known or proven to produce at least some carbon fractals) and that that composition is then enriched in the carbon fractal. For example, carbon fractals obtained by at least partial removal of a solvent or undesired non-carbon fractal component from a composition containing a carbon fractal are considered isolated carbon fractals.

As still further used herein, the term "activated acid catalyst" refers to an acidic solution of a compound, wherein the solution (typically, but not necessarily aqueous) is subjected to an electromagnetic field, electromagnetic radiation, and/or laser irradiation. Most preferably, the activated acid catalyst comprises an acidic solution that is plasma-activated and/or comprises a compound having the general formula $MXO_n$, wherein M is selected from the group consisting of H, $NH_4$, Na, and K, wherein X is selected from the group consisting of Cl, Br, and I, and wherein n is an integer between 0 and 4, inclusive. It should be noted that the term "activated acid catalyst" also includes one or more oxidizers (typically, but not necessarily in aqueous solution) that were previously subjected to electromagnetic radiation, an electromagnetic field, and/or laser irradiation. Alternatively, and in less preferred aspects, activation using the electromagnetic radiation, electromagnetic field, and/or laser irradiation may replaced by admixing the acid or oxidizer with a penetration enhancer (e.g., compounds and/or mixtures commonly found in lubricating formulations, etc.).

Figure 1B:
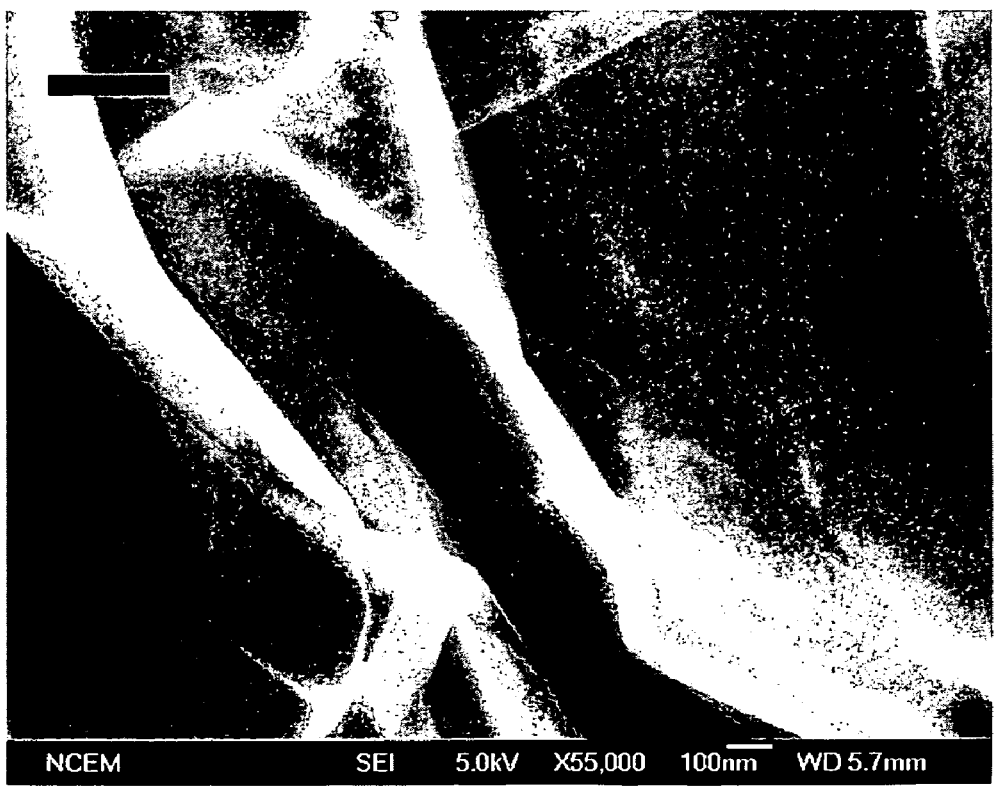
FIG. 1B is a detail view of the graphene of FIG. 1B at a higher magnification.

In one preferred aspect of the inventive subject matter, the inventors discovered graphene can be produced from commercially available graphite (e.g., Natural crystalline flake graphite from Superior Graphite Co., 10 S. Riverside Plaza, Chicago, Ill. 60606) using commercially available activated acid catalyst (e.g., Activated Acid Catalyst #3 [Plasma-activated hydrochloric acid] from SupraCarbonic, LLC., 348 N. Eckhoff Street, Orange, Calif. 92868, USA). For example, the crystalline flake graphite is granulated to a size between about 0.1 and several millimeter and mixed with the activated acid catalyst in approximately same weight proportions (e.g., 10 gram graphite with 10 ml activated acid catalyst). The so prepared activated graphite is then subjected to heating at a temperature of about 120° C. for up to two minutes (typically less than 40 seconds) to expansion (up to 500-fold in volume). Exemplary electronmicrographs of the so produced material are depicted in FIG. 1A and FIG. 1B at different magnification.

It should be especially noted that so prepared compositions are significantly distinct in structural and molecular aspects from currently known expanded graphite/intercalated graphite. Among other differences, graphene produced according to the inventive subject matter is a substantially monoatomic (and in some cases oligoatomic) flat or wrinkled layer of polycyclic aromatic carbon, while expanded graphite typically has a worm-like configuration with wall strengths in the micrometer range as depicted in Prior Art FIG. 2A. Also, the interconnected thick walls of expanded graphite in the worms form a honeycomb structure as depicted in Prior Art FIG. 2B, whereas the monoatomic (and in some cases oligoatomic) flat or wrinkled graphene layers in contemplated compositions are independent layers.

While not wishing to be bound by any hypothesis or theory, the inventors contemplate that the graphene produced according to the inventive subject matter is a result of complete penetration of the acid catalyst between each of the graphene layers in the graphite and violent and exothermic reaction of the catalyst with the graphite. Moreover, due to the exothermic nature and other factors, it should be recognized that the acid catalyst may be substantially completely (i.e., greater 99%) removed from the graphene. However, and especially where alternative acid catalysts are employed, it should also be recognized that the catalyst (or portions thereof) may be partially (between 1-10%, 10-25%, 25-50%, 50-75%, or 75-90%) or even entirely (90-99%) retained within the graphene.

In alternative aspects, numerous carbonaceous starting materials other than crystalline flake graphite may be employed, and it should be recognized that many carbon-containing materials are suitable for use herein. However, especially preferred carbonaceous materials include those predominantly (>80 atom %) comprising carbon. Therefore, suitable carbonaceous starting materials include coal, tar, natural and synthetic graphite, pyrolysis products, coke, carbonized organic matter, and/or carbonized synthetic fibers. Suitable carbonaceous materials also include various synthetic compounds, and especially synthetic (preferably polycyclic) aromatic compounds.

Contemplated starting materials, and especially graphite may also be doped or derivatized with one or more heteroatoms (e.g., optionally substituted nitrogen, oxygen, sulfur, boron, etc.) and/or substituents. The term "substituted" as used herein also refers to a replacement of a chemical group or substituent (e.g., hydrogen) with a functional group, and particularly contemplated functional groups include nucleophilic (e.g., —$NH_2$, —OH, —SH, —NC, etc.) and electrophilic groups (e.g., C(O)OR, C(X)OH, etc.), polar groups (e.g., —OH), non-polar groups (e.g., aryl, alkyl, alkenyl, alkynyl, etc.), ionic groups (e.g., —$NH_3^+$), halogens (e.g., —F, —Cl), and all chemically reasonable combinations thereof. Thus, the term "substituent" includes nucleophilic (e.g., —$NH_2$, —OH, —SH, —NC, etc.) and electrophilic groups (e.g., C(O)OR, C(X)OH, etc.), polar groups (e.g., —OH), non-polar groups (e.g., aryl, alkyl, alkenyl, alkynyl, etc.), ionic groups (e.g., —$NH_3^+$), halogens (e.g., —F, —Cl), and all chemically reasonable combinations thereof. Such substituted or doped starting materials may then result in chemically modified nanostructures.

Depending on the particular starting material, it should be appreciated that the structure of the graphene obtained by contemplated methods may vary considerably. For example, where a high-quality flake graphite is employed, relatively large graphene sheets will be produced. On the other hand, where a low grade graphite is employed as a starting material, fractured or otherwise imperfect graphene is obtained. Thus, and at least to some degree, the graphene structure will influence the structure of nanostructured derived from the graphene. For example, where a relatively large proportion of fractured graphene is present, formation of nanofractals is favored. Similarly, where moderately fractured graphene is produced from an intermediate-grade graphite, formation of branched nanotubes is favored.

With respect to the acid catalyst it is contemplated that the particular chemical nature of the catalyst and/or activation of the catalyst may vary considerably. However, it is generally contemplated that the catalyst has a composition such that the catalyst will soak throughout the entire starting material. Preferred acid catalysts include acidic solutions that are plasma-activated and/or comprises a compound having the general formula $MXO_n$, wherein M is selected from the group consisting of H, $NH_4$, Na, and K, wherein X is selected from the group consisting of Cl, Br, and I, and wherein n is an integer between 0 and 4, inclusive. Further preferred acid catalysts include oxidizing agents, activated or formulated such that the oxidizing agent will entirely penetrate the starting material.

It should also be recognized that the ratio of carbonaceous material to acid catalyst may vary, and suitable ratios are typically between 100:1 and 1:100, more preferably between 10:1 and 1:10, and most preferably between 4:1 and 1:4 on a weight-by-weight basis. The exact-ratio will depend on the nature of the starting material and/or the degree of fractionation of the graphite. For example, where the starting material is relatively solid and has a relatively low degree of porosity, larger quantities of acid catalyst relative to the starting material may be required. On the other hand, where the starting material is powdered flake graphite, less than equal amounts of acid catalyst may be required be determined. Moreover, and at least to some degree, the ratio of acid catalyst to carbonaceous material will not only determine the degree of breakage between graphene layers, but also the degree of breakage of carbon-carbon bonds within one layer. Therefore, it should be recognized that preferred acid catalysts also break one or more carbon-carbon bonds within one layer.

Heating or provision of energy other than thermal energy to expand the activated intermediate (e.g., flake graphite comprising the activated acid catalyst) may be performed in numerous manners, and it should be recognized that any energy is suitable for use in conjunction with the teachings presented herein. Therefore, generally contemplated energies include chemical (e.g., via exothermic reaction), thermal (e.g., via heater, IR radiation), electrical (e.g., resistive or inductive heating), electromagnetic (e.g., via microwave irradiation), and/or mechanical (e.g., via compression), etc. Most typically the energy is provided in an amount sufficient to initiate some expansion, which itself is an exothermic process. Once the critical amount of energy is delivered, heat generated from the exothermic expansion reaction will carry the remaining energy requirement for expansion of the entire load of activated intermediate. For example, where thermal energy is used as energy, heating of the activated intermediate to a temperature of about 100-200° C. for several seconds is generally sufficient. However, higher temperatures (e.g., between 200-400° C., or between 400-800° C., and even higher) are also contemplated. Similarly, the time required and/or desired for providing the energy may vary considerably. For example, where the energy is provided as a mechanical impact energy, several milliseconds may be sufficient. On the other hand, where the energy is provided as radiant heat, heating may be performed for between 5 seconds to several minutes. While heating of the graphite is typically done in a static manner, it should be recognized that heating may also be performed in a container in which the heated material is suspended (e.g., in a counter current of inert gas, or fluidized bed). Moreover, it should be recognized that the further processing of graphene into nanostructures other than the graphene obtained by the expansion reaction may be performed in the same step as the expansion. Therefore, heating may be performed using different temperature profiles and durations. Consequently, it should be recognized that the starting material after expansion may include one or more of graphene, an open-ended nanotube, a branched nanotube, a ring-shaped nanotube, and a carbon fractal.

The so obtained graphene or graphene-containing composition may optionally be treated using one or more solvents to remove impurities/undesirable material, and/or to dilute the so obtained material (for further especially preferred chemical modifications, and especially metal deposition, see below). Where desirable, the material may also be chemically or physically treated. For example, the graphene or graphene-containing composition may be chemically modified to add a substituent or doping element. Contemplated physical treatments include compaction and/or heating, sonication, size separation, etc.

In especially preferred aspects of the inventive subject matter, the graphene or graphene-containing composition is further processed to provide a re-shaped nanostructured material. Most preferably, reshaping of the graphene is performed by providing energy to the graphene, typically heating using radiant heat, induction heating, or microwave heating. Preferably, the temperature for the re-shaping is between about 200° C. and 1200° C., more preferably between 300° C. and 1000° C., and most preferably between 400° C. and 800° C. Where desired, the graphene or graphene-containing composition is evacuated before the energy for reshaping is provided. It should be recognized that the particular shape of the re-shaped nanostructured material will to a relatively large degree depend on both the starting material and process conditions.

For example, where high-quality flake graphite is provided as starting material, relatively large and structurally homogeneous graphene layers are obtained, which will favor formation of open-ended single wall nanotubes. Lower-quality graphite will typically result in a more inhomogeneous population of graphene, which will typically favor formation of branched nanotubes and/or ring-shaped nanotubes. In most cases, technical graphite will yield fractured graphene, which in turn will favor formation of carbon fractals. Similarly, excess of acid catalyst will generally favor breaking of carbon-carbon bonds within a graphene layer, and therefore tend to favor branched nanotubes and/or carbon fractals. Heating of the graphene for relatively short periods will typically favor relatively short nanotubes and/or formation of carbon fractals, while heating over a relatively long period will generally favor long carbon nanotubes.

It should still further be appreciated that the nanostructures according to the inventive subject matter (e.g., graphene, carbon fractal, de-novo open-ended SWNT, branched nanotube, ring-shaped nanotube) may be further derivatized by chemical compounds (e.g., fluorination, oxidation, amidation, etc.) to introduce pendant (within the graphene plane) or terminal (at the end of a graphene) functional groups or dopants.

Most preferably, however, it is contemplated that the nanostructures according to the inventive subject matter are coated with one or more metals, and especially noble metals. The term "noble metal" as used herein refers to metals of groups VIIb, VEII, and Ib of the second and third transition series. Particularly contemplated noble metals therefore include rhenium, ruthenium, rhodium, palladium, silver, osmium, iridium, platinum, and gold. Furthermore, it generally preferred that the coating of the metal to the nanostructure is relatively thin. For example, suitable coatings will typically have a thickness of less than 100 atoms, more typically less than 50 atoms, even more typically less than 10 atoms, and most typically less than 5 atoms. Therefore, contemplated coating processes will preferably include those in which the metal is deposited from a gas phase (e.g., physical vapor deposition, chemical vapor deposition, plasma deposition, sputtering, etc.). It should still further be noted that the metal coating of graphene from vapor phase will typically coat the graphene on both faces of the graphene layer. Therefore, reformed structures, and especially nanotubes from metal coated graphene may have a metal coat on the inside of the nanotube. However, alternative coating processes are also considered such as galvanic plating and electroless plating. Thus, the term "plating" or "coating" as used in conjunction with metal deposition on contemplated nanostructures excludes processes in which a nanostructure is placed or grown on a metal and/or in which a metal is placed onto the nanostructure to cover the nanostructure.

Therefore, the inventors contemplate numerous compositions comprising contemplated nanostructures, and especially those comprising at least 0.1 wt % to at least 1 wt %, more typically at least 5 wt % graphene, even more typically at least 10-20 wt %, 20-40 wt %, 40-80 wt %, and most typically at least 80-90 wt %, or 90-99.9 wt % graphene, carbon fractals, and/or other carbon nanostructures presented herein. Still further, it should be appreciated that at least some of the graphene, carbon fractals, and/or other carbon nanostructures may be coated with a metal (most preferably a noble metal). It should further be recognized that in such compositions the balance of the material may be any material, and exemplary balance materials include carbonaceous starting materials, silicon-based materials, metal-containing materials, and/or materials other than graphene, carbon fractals, and/or other carbon nanostructures presented herein.

Contemplated compositions may be advantageously used in numerous manners, and according to their desirable properties. For example, where the nanostructures are uncoated, they may provide substantial stability of thermal conductivity to materials into which they are integrated. Integration may be merely by admixing, but also by covalent bonding with other materials. For example, contemplated nanostructures may be partly oxidized (e.g. at high temperatures), and the so introduced oxygen may be further reacted to for a acid, alcohol, or keto group that is then used for covalent binding (via crosslinker or otherwise). In another example, and especially where the nanostructure is metal coated, such nanostructures may be employed in an electric conductor, an electron emitter, and/or an electrode.

Based on the simple manner of production, it should be noted that the nanostructures according to the inventive subject matter have now become available in bulk quantities (e.g., several hundred tons per year) at relatively low cost of manufacture. Therefore, the inventors contemplate bulk composition of at least 1000 gram comprising at least 10 gram of at least one of a graphene, an open-ended carbon nanotube, and a carbon fractal. Typically, the graphene, the open-ended carbon nanotube, and/or the carbon fractal are present in an amount effective to increase thermal conductivity, electrical conductivity, adsorption, and/or a mechanical stability of the bulk composition (e.g., at least ten fold, and more typically at least hundred fold). Further aspects, compositions, methods, and uses are disclosed in our commonly owned copending U.S. applications with the title "Compositions and Methods for Gas and liquid Purification" (filed Dec. 7, 2004) and "Binding And In Situ Destruction Of Chemical Agents And Other Contaminants" (filed Dec. 7, 2004), both of which are incorporated by reference herein.

EXAMPLES

The following examples are provided only to illustrate selected aspects of the inventive subject matter and are not limiting to the inventive concept presented herein.

Production of Graphene 100 g of flake graphite (e.g., commercially available from Superior Graphite Company, 10 South Riverside Plaza, Chicago, Ill. 60606, or Crystal Graphite Corp., Vancouver, B.C., Canada) was admixed with 100 ml activated acid catalyst (e.g., Activated Acid Catalyst #3, commercially available from SupraCarbonic, 348 N. Eckhoff Street—Orange, Calif. 92868, USA) and briefly heated to expansion at about 100° C. to about 200° C. The so obtained material was used without further purification for electron microscopy and exemplary electron micrographs at different magnifications are shown in FIG. 1A and FIG. 1B. Depending on the purity and quality of the graphite, the so obtained material typically comprises between 30 wt % and 99 wt % graphene.

Figure 3:
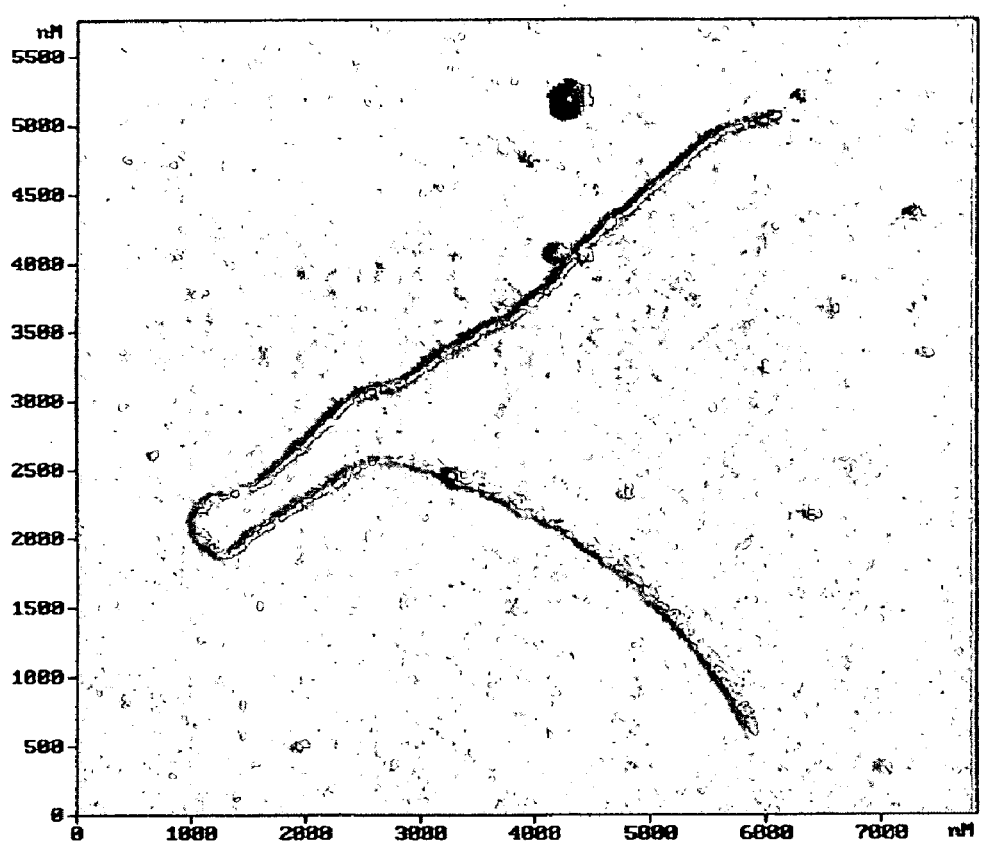
FIG. 3 is an exemplary electronmicrograph depicting an open-ended carbon nanotube formed from graphene according to the inventive subject matter.
Figure 4:
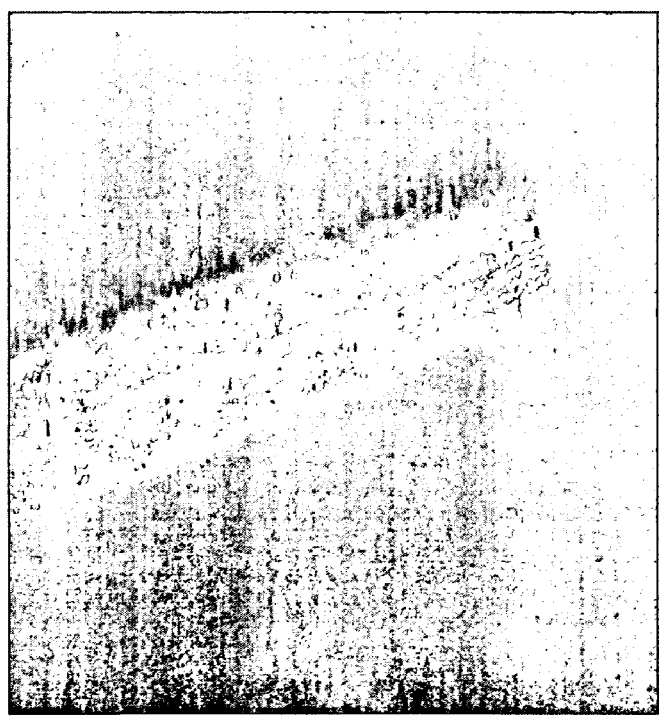
FIG. 4 is a detail view of the open end of the nanotube of FIG. 3 at a higher magnification.
Figure 5:
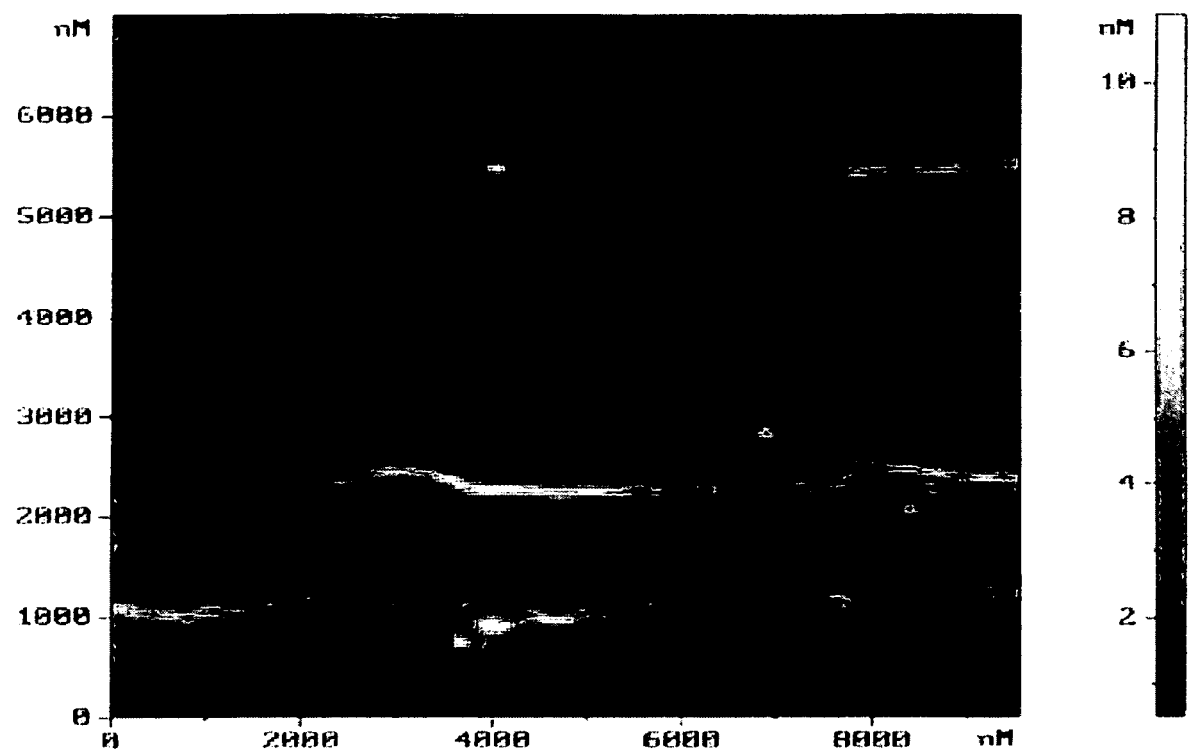
FIG. 5 is an exemplary electronmicrograph depicting a branched carbon nanotube formed from graphene according to the inventive subject matter.

Production of Open-Ended SWNT from Graphene 1 g of graphene produced as described above was placed into a refractory container, hermetically sealed and evacuated to a pressure between about 100 mbar to about 1 mbar. After evacuation, the graphene was heated to a temperature of between 500° C. and 700° C. Depending on the starting material and purity, heating is performed between several seconds and several minutes. After cool-down, the reaction product was mixed with acetone and/or toluene, sonicated where appropriate, and the floating material was captured and dried under vacuum. The so obtained material was used without further purification for electron microscopy and exemplary electron micrographs are shown in FIG. 3 and FIG. 4. Depending on the reaction conditions and starting materials (e.g., where intermediate-grade graphite was used as starting material), varying amounts of branched nanotubes were obtained, and exemplary branched nanotubes are depicted in FIG. 5.

Production of Carbon Fractals and Carbon Rings from Graphene

Figure 6:
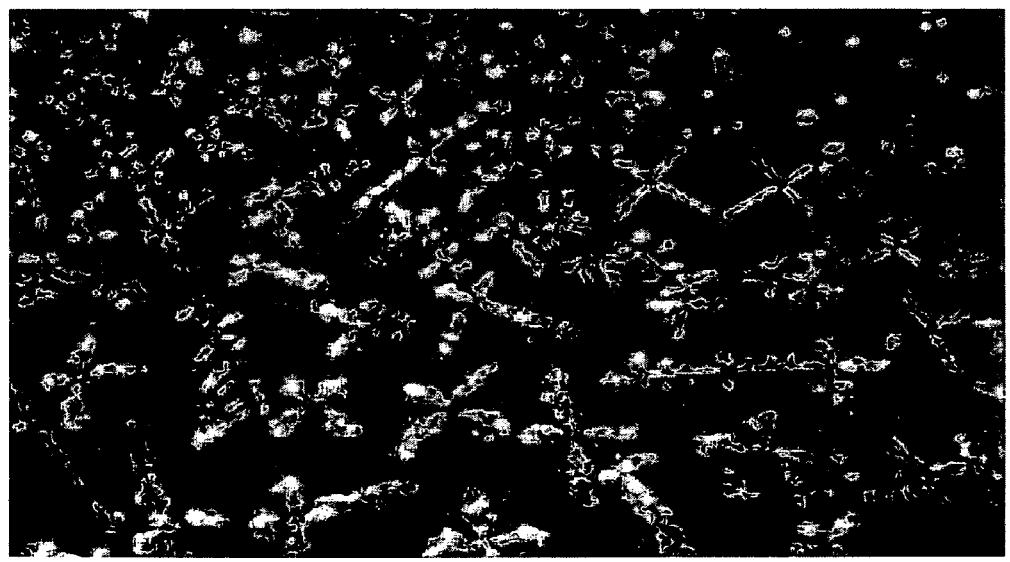
FIG. 6 is an exemplary electronmicrograph depicting a metal coated carbon fractal formed from graphene according to the inventive subject matter.
Figure 7:
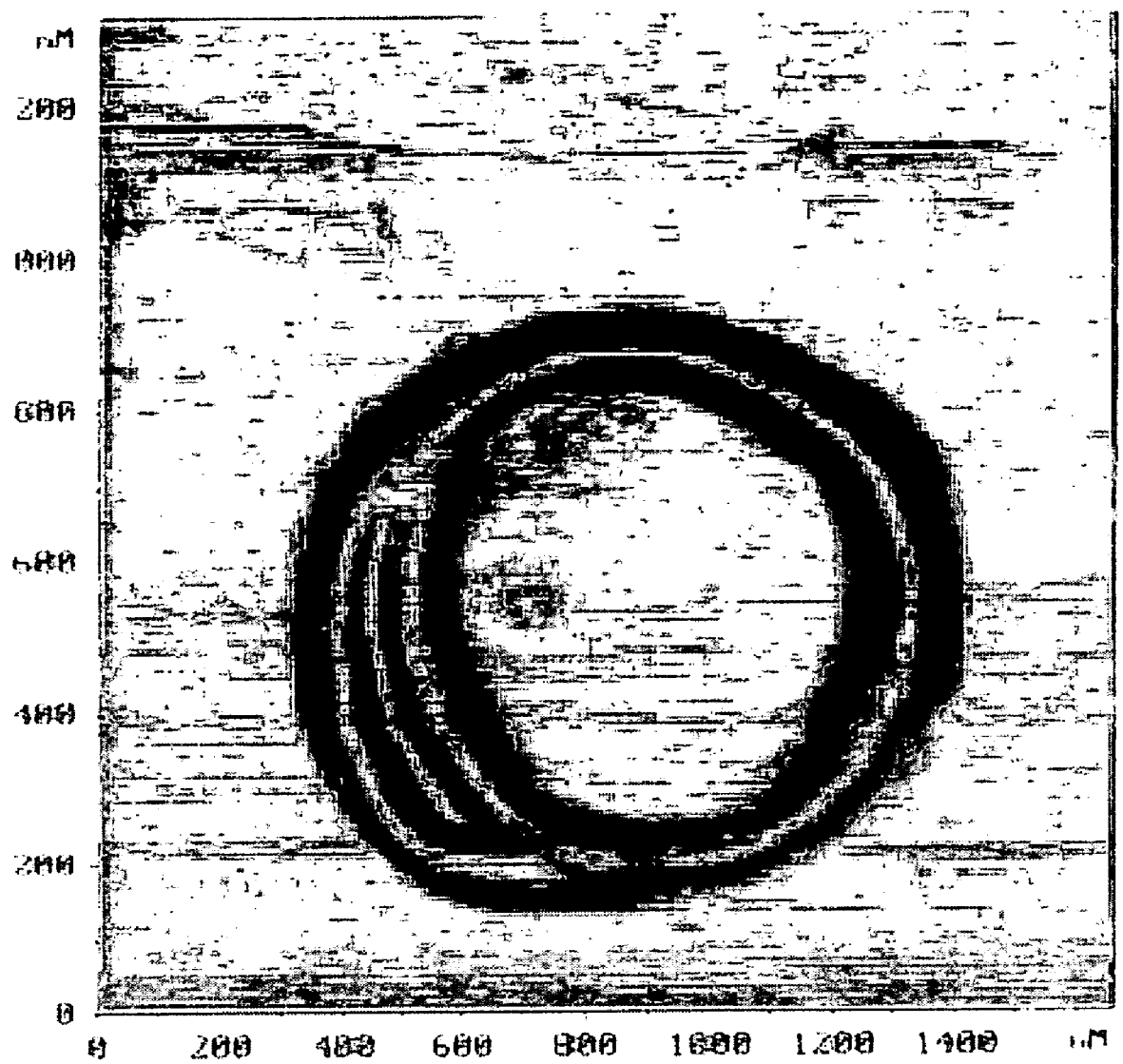
FIG. 7 is an exemplary electronmicrograph depicting a ring-shaped carbon nanotube.

Similar to the procedure for open-ended SWNT from graphene, 1 g of low grade graphite (e.g., technical, synthetic, or amorphous) was used to produce low grade, fractured graphene by mixing the graphite with 1 ml of activated acid catalyst (e.g., Activated Acid Catalyst #3) and subsequent thermal expansion. The so obtained low grade graphene was placed into a refractory container, hermetically sealed, and evacuated to a pressure between about 100 mbar to about 1 mbar. After evacuation, the graphene was heated to a temperature of between 500° C. and 700° C. for about 60 seconds. After cool-down, the reaction product was mixed with acetone and/or toluene, sonicated where appropriate, and the floating material was captured and dried under vacuum to isolate or enrich the carbon fractals. The so obtained material was used without further purification for electron microscopy and an electron micrograph is shown in FIG. 6. Depending on the reaction conditions (e.g., where less activated acid catalyst was used and heating time was above one minute), varying amounts of ring-shaped nanotubes were also obtained, and exemplary ring-shaped nanotubes are depicted in FIG. 7.

Thus, specific embodiments and applications of compositions and methods for binding and in situ destruction of chemical agents have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

What is claimed is:

1. A method of preparing a composition comprising a nanostructured carbon, the method comprising:
   contacting a carbonaceous starting material with an activated acid catalyst to form an activated intermediate; and
   providing thermal energy to the activated intermediate to thereby forming a graphene;
   wherein the activated acid catalyst comprises an acidic solution previously subjected to an electromagnetic field, electromagnetic radiation, laser irradiation, or plasma activation.

2. The method of claim 1 wherein the carbonaceous starting material is selected from the group consisting of graphite, coal, tar, and coke.

3. The method of claim 1 wherein the acid catalyst comprises plasma-activated hydrochloric acid.

4. The method of claim 1 wherein the step of providing thermal energy comprises heating the activated intermediate to a temperature of between about 100° C. and about 200° C.

5. The method of claim 1, further comprising providing energy to the graphene thereby forming a carbon nanostructure selected from the group consisting of an open-ended carbon nanotube, a branched open-ended carbon nanotube, a circular carbon nanotube, and a carbon fractal.

6. The method of claim 5 wherein the carbon nanostructure is selected from the group consisting of an open-ended carbon nanotube, a branched open-ended carbon nanotube, and a circular carbon nanotube.

7. The method of claim 5 wherein the carbon nanostructure is a carbon fractal.

8. The method of claim 5, wherein the step of providing energy to the graphene comprises heating the graphene to a temperature of between about 400° C. and about 800° C.

* * * * *